(12) United States Patent
Jonsson

(10) Patent No.: US 10,398,270 B2
(45) Date of Patent: Sep. 3, 2019

(54) MOBILE VACUUM CLEANING DEVICE

(71) Applicant: Ake Jonsson, Gävle (SE)

(72) Inventor: Ake Jonsson, Gävle (SE)

( * ) Notice: Subject to any disclaimer, the term of this patent is extended or adjusted under 35 U.S.C. 154(b) by 249 days.

(21) Appl. No.: 15/127,675

(22) PCT Filed: Mar. 17, 2015

(86) PCT No.: PCT/EP2015/055486
§ 371 (c)(1),
(2) Date: Sep. 20, 2016

(87) PCT Pub. No.: WO2015/140128
PCT Pub. Date: Sep. 24, 2015

(65) Prior Publication Data
US 2018/0049612 A1 Feb. 22, 2018

(30) Foreign Application Priority Data

Mar. 21, 2014 (EP) .................................. 14161007

(51) Int. Cl.
| | | |
|---|---|---|
| A47L 9/00 | (2006.01) | |
| B62B 3/10 | (2006.01) | |
| A47L 5/36 | (2006.01) | |
| A47L 9/24 | (2006.01) | |
| B62B 3/00 | (2006.01) | |
| A47L 9/12 | (2006.01) | |
| A47L 9/16 | (2006.01) | |

(52) U.S. Cl.
CPC .............. *A47L 9/0063* (2013.01); *A47L 5/36* (2013.01); *A47L 9/009* (2013.01); *A47L 9/0027* (2013.01); *A47L 9/0036* (2013.01); *A47L 9/0081* (2013.01); *A47L 9/122* (2013.01); *A47L 9/16* (2013.01); *A47L 9/248* (2013.01); *B62B 3/005* (2013.01); *B62B 3/10* (2013.01); *B62B 2202/50* (2013.01)

(58) Field of Classification Search
CPC .......... A47L 9/0063; A47L 9/122; A47L 9/16; A47L 9/248; A47L 5/36; A47L 9/0081; A47L 9/009; A47L 9/0036; A47L 9/0027; B62B 3/005; B62B 3/10; B62B 2202/50
USPC ................................... 15/327.1, 327.2, 323
See application file for complete search history.

(56) References Cited

U.S. PATENT DOCUMENTS

| | | | |
|---|---|---|---|
| 2,704,855 A | 3/1955 | Heinze | |
| 4,989,291 A * | 2/1991 | Parent | ................... A47L 9/0027 15/315 |
| 2003/0070248 A1 | 4/2003 | Jonsson | |
| 2010/0017998 A1 | 1/2010 | McCambridge et al. | |

FOREIGN PATENT DOCUMENTS

| | | |
|---|---|---|
| DE | 93 07 792 U | 8/1993 |
| ES | 2 233 172 A1 | 6/2005 |
| JP | S52-19472 U | 2/1977 |

\* cited by examiner

*Primary Examiner* — David Redding
(74) *Attorney, Agent, or Firm* — Dilworth & Barrese, LLP

(57) ABSTRACT

A mobile vacuum cleaning device comprises a housing (1) containing a vacuum cleaner and having an aperture (5) to allow a suction hose (6) to be led therethrough and coupled to an intake air inlet of the vacuum cleaner and an opening (7) to direct air exhausted by the exhaust air outlet of the vacuum cleaner out of the housing. The housing has members (11) making it movable.

12 Claims, 2 Drawing Sheets

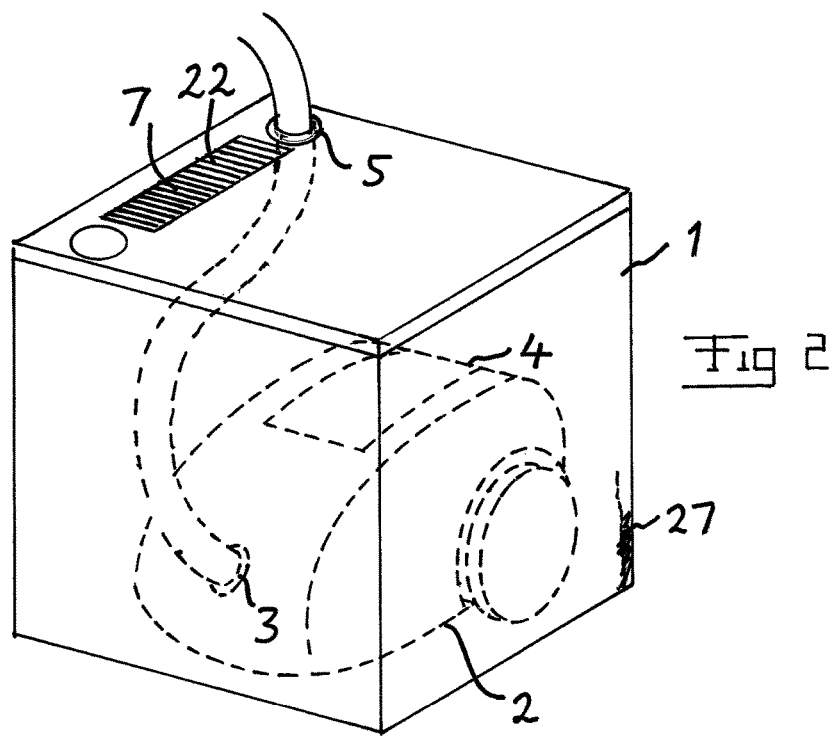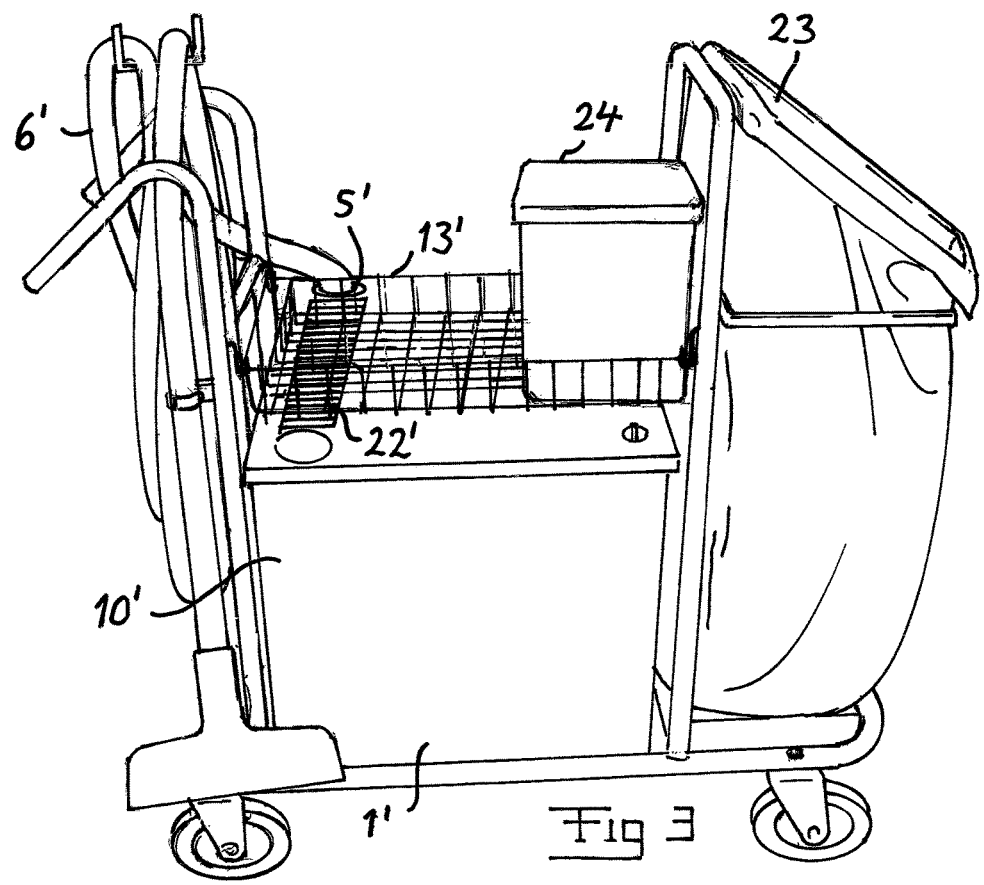

MOBILE VACUUM CLEANING DEVICE

TECHNICAL FIELD OF THE INVENTION AND BACKGROUND ART

The present invention relates to a mobile vacuum cleaning device comprising a vacuum cleaner having an intake air inlet, an exhaust air outlet and a particle separator.

"Mobile" does here mean that the device may be moved between different locations within a building, especially by being pulled or pushed on a floor, for vacuum cleaning different parts of a said building.

Such mobile vacuum cleaning devices used for vacuum cleaning in, for instance, dwellings, offices, hospitals, shops and industrial premises and the like are normally present in the form of mobile vacuum cleaners of the type that includes a wheelcarried casing having a fan driven by an electric motor, which from a nozzle pipe and a hose sucks particle-mixed intake air through a replaceable bag in which the main part of the particles are caught before the air is forwarded to an exhaust air outlet, adjacent to which there is a fine filter having the desired filtration capacity, usually in the form of a so-called HEPA filter. A number of disadvantages are adhered to such a mobile vacuum cleaning device, and one of them is that it gives rise to relatively high noise levels, which primarily are annoying in the room where vacuum cleaning is carried out, but also in nearby rooms.

SUMMARY OF THE INVENTION

The object of the present invention is to provide a mobile vacuum cleaning device being improved in at least some aspect with respect to such devices already known.

This object is according to the invention obtained by providing a mobile vacuum cleaning device with the features listed herein.

Thanks to the fact that said vacuum cleaner is arranged in a movable housing the level of noise created during the operation of the device will be considerably reduced with respect to a conventional vacuum cleaner making it possible to carrying out vacuum cleaning at locations where the level for acceptable noise is low, such as in a hotel room adjacent to a hotel room in which someone is sleeping, for instance an engine driver sleeping after working the night, or in a room in which people are working.

According to an embodiment of the invention a trolley carries the housing and is provided with members for moving the housing, such as wheels, and according to another embodiment the trolley has means configured to receive and contain equipment and utensils useful for cleaning work and expendable supplies associated with such work, such as soap, toilet paper, etc. The trolley and said means thereof enable by this a considerable saving of time when carrying out cleaning work of for example hotel rooms, since all equipment and utensils useful for such cleaning work and expendable supplies associated with such work will be easily accessible and always within reach when moving the mobile vacuum cleaning device from one location to another location.

According to another embodiment of the invention said means comprises one or a plurality of shelves connected to a frame of the trolley, and these shelves are according to another embodiment of the invention basket-like. Such shelves are suitable for carrying said equipment, utensils and expendable supplies to be carried and transported on the trolley, and these shelves are preferably arranged, in a stack when there are more than one, above said housing containing the vacuum cleaner.

According to another embodiment of the invention at least one of said shelves is removably connected to said frame of the trolley, which may facilitate filling of the shelves with suitable material before starting a cleaning work or refilling thereof during such cleaning work.

According to another embodiment of the invention said means is configured to contain towels and/or bedding for a plurality of beds making the device suitable for cleaning rooms in hotels and similar buildings.

According to another embodiment of the invention the suction hose of the device is extraordinary long and has a length of at least 3 meters or at least 5 meters or at least 7 meters or at least 10 meters counted from said aperture of the housing. This means that the trolley of the mobile vacuum cleaning device may stand in a fixed position while carrying out vacuum cleaning within a larger area, so that the problem associated with conventional vacuum cleaners hitting furniture, fillets and the like and causing damage thereto may be avoided. When for instance cleaning hotel rooms the trolley may then be placed at the entrance threshold of that room and vacuum cleaning of the room as well as further necessary cleaning work, such as refilling expendable supplies and bed-making, may be carried out while having the trolley with all necessary equipment in a perfect position well accessible and not disturbing the work in any way.

According to another embodiment of the invention said trolley comprises a hose holder to hold portions of said suction hose not used and a holder configured to hold a holder pipe to be connected to said hose and having a suction nozzle when not used for vacuum cleaning. This facilitates transport of the mobile vacuum cleaning device when not used for vacuum cleaning or when there is only necessary to use a part of the long suction hose for the vacuum cleaning.

According to another embodiment of the invention the device comprises at least one filter arranged upon said exhaust air opening of the housing to additionally filter the air exhausted through the exhaust air outlet of the vacuum cleaner and which has been filtered in the particle separator of the vacuum cleaner. The vacuum cleaning device will by this feature solve the problem of conventional vacuum cleaners, namely that the air that is let out in for instance dwelling areas always contains minor amounts of fine particles that have not been possible to capture by said particle separator of the vacuum cleaner. This does not only result in a distribution of dust particles already sucked into the vacuum cleaner, but it does also imply inconveniences for for instance allergic persons. However, by making the air exhausted through the exhaust air outlet of the vacuum cleaner to pass said filter, which is preferably dimensioned exactly for particles of the size desired to be caught thereby, the exhaust air blown out in the space surrounding said housing will have a low content of such fine particles increasing the efficiency of the vacuum cleaning considerably with respect to conventional vacuum cleaners.

According to another embodiment of the invention said vacuum cleaner is a mobile vacuum cleaner, and said portion of the housing being separable from the rest of the housing is configured to uncover an opening through which the vacuum cleaner may be placed into and removed from the interior of the housing. This means that a conventional vacuum cleaner available on the market to a low cost may be used as the vacuum cleaner in the mobile vacuum cleaning device of the present invention and still the disadvantages of such a mobile vacuum cleaner mentioned above be avoided by putting it in said housing as disclosed above.

According to another embodiment of the invention at least parts of the inner walls of said housing are provided with a lining of a sound-insulating material, such as mats of rubber or fibre material or material with open cells. This makes the operation of the device even more silent.

The invention is also directed to a use of a vacuum cleaning device according to the invention for cleaning rooms in buildings having a plurality of bedrooms, such as hotel rooms, or buildings containing places of work, such as offices or shops. The advantages of a use of such a vacuum cleaning device for such cleaning work appear clearly from the above discussion of the mobile vacuum cleaning device according to the invention and is primarily due to the trolley thereof which may contain all the equipment and utensils useful and necessary for cleaning work and expendable supplies associated with such work.

Further advantages as well as advantageous features of the invention will appear from the description following below.

BRIEF DESCRIPTION OF THE DRAWINGS

With reference to the appended drawings, below follows a specific description of embodiments of the invention cited as examples.

In the drawings:

FIG. 2 is a transparent perspective view of a housing containing a vacuum cleaner of the device shown in FIG. 1, and FIG. 3 is a perspective view of a mobile vacuum cleaning device according to a second embodiment of the invention.

DETAILED DESCRIPTION OF EMBODIMENTS OF THE INVENTION

Figure 1:
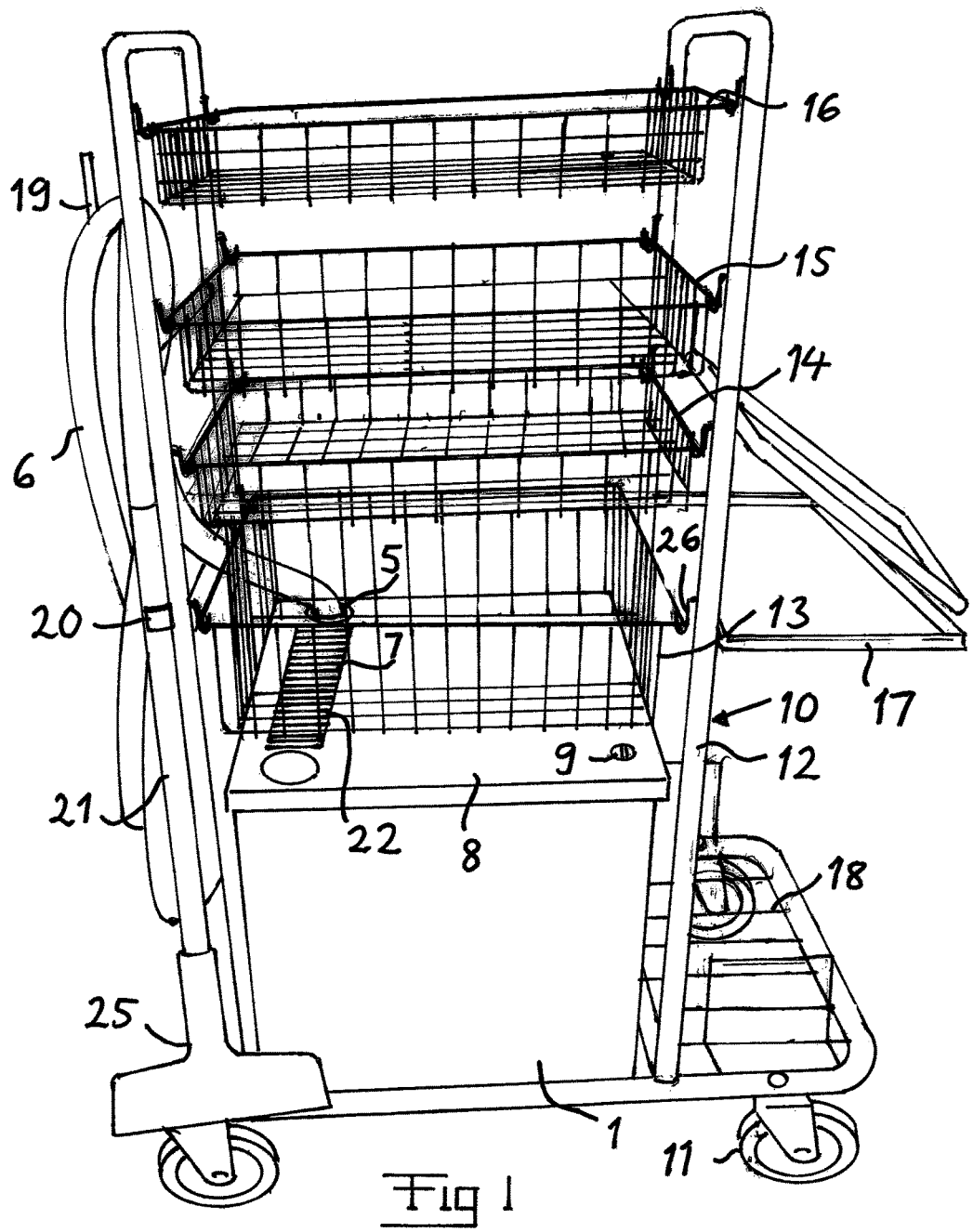
FIG. 1 is a perspective view of a mobile vacuum cleaning device according to a first embodiment of the invention.

A mobile vacuum cleaning device according to a first embodiment of the invention will now be described while making reference to FIGS. 1 and 2. The device comprises a housing 1 containing a vacuum cleaner 2 in the form of a conventional mobile vacuum cleaner having an intake air inlet 3, an exhaust air outlet 4 and a particle separator. The housing has an aperture 5 allowing a suction hose 6 or a connection therefor to be led therethrough and coupled to said intake air inlet of the vacuum cleaner. The housing has also an opening 7 to direct air exhausted by the exhaust air outlet of the vacuum cleaner 2 out of the housing 1. A portion of the housing in the form of a lid 8 is separable from the rest of the housing by operating locking means 9 securing the lid 8 to the rest of the housing in order to uncover an opening through which said particle separator of the vacuum cleaner may be emptied, actually by removing a replaceable bag of the particle separator, and also the entire vacuum cleaner 2 may be taken out of the housing and placed therein again. The inner walls of the housing are provided with a lining 27 of a sound-insulating material.

The device also comprises a trolley 10 carrying the housing 1 and movable by resting on wheels 11. Said trolley has a frame 12 and means in the form of basket-like shelves 13-16 configured to receive and contain equipment and utensils useful for cleaning work and expendable supplies associated with such work, such as soap, toilet paper, etc. The shelves may then also receive towels and/or bedding for a plurality of beds for use of the mobile vacuum cleaning device for cleaning hotel rooms or similar premises. The shelves 13-16 are removably arranged on the frame 12, here by hanging on hooks 26 on the frame. This facilitates especially refilling of the shelves. And it may also be necessary to remove the lowest shelf 13 for operating the lid 8, such as removing it.

Means 17 for holding a garbage sack resting on a shelf 18 provided beside the housing 1 is also attached to the frame 12 of the trolley 10.

The device comprises an extraordinary long suction hose 6, which may have a length of for instance 10 meters or even 15 meters or more counted from the aperture 5 of the housing, and the trolley comprises a hose holder 19 configured to hold portions of said suction hose not used and a holder 20 configured to hold a holder pipe 25 to be connected to said hose 6 and having a suction nozzle 21 when not used for vacuum cleaning as seen in FIG. 1.

The housing further comprises at least one filter 22 arranged upon said exhaust air opening 7 of the housing to additionally filter the air exhausted through the exhaust air outlet 4 of the vacuum cleaner and which has been filtered in the particle separator of the vacuum cleaner 2.

FIG. 3 illustrates a mobile vacuum cleaning device according to a second embodiment of the invention only differing from the one shown in FIG. 1 by having a lower height of the trolley, so that it has only one shelf. Parts of that device corresponding to parts of the device shown in FIG. 1 have therefor been provided with the same reference numerals added by a '. It is there shown how a garbage sack 23 is attached to the trolley 10' and a bucket 24 is resting on the shelf 13'.

The function of a mobile vacuum cleaning device according to the invention will now be described for one of the possible uses in the form of cleaning of hotel rooms. When this is to be done the shelves 13-16 of the trolley are filled with all equipment and utensils to be used for cleaning a rather high number of hotel rooms and also expendable supplies associated with such cleaning work, such as soap, toilet paper, etc. The trolley is then moved to the entrance of a hotel room and for instance two of the wheels 11 moved over the threshold of that room. The cleaning work of that room is then started and carried out while having the trolley on the same spot until the next hotel room is to be cleaned. Thus, vacuum cleaning of the room may then be carried out by starting the vacuum cleaner 2 inside the housing 1, preferably by connecting a flex led through the aperture 5 to a socket for supply of electricity. The length of the suction hose 6 makes it possible to reach all areas of the hotel room without moving the trolley 10. Materials for bed-making, cleaning of toilets, refilling of expendable supplies and the like will be taken from the shelves of the trolley when carrying out such work. Garbage may be put in a garbage sack hanging on the trolley. When the hotel room is cleaned the trolley may be rolled to the adjacent hotel room and the procedure will be repeated. This procedure may then be repeated for a high number of hotel rooms until it will be necessary to refill the trolley with material run out, so that the cleaning work may be carried out very efficiently.

It is obvious that a device according to the invention is well suited to be used for cleaning for instance buildings containing places of work, such as offices, and the trolley will then be moved between different locations for staying there when the cleaning work in the area around such a location is carried out. The material necessary for such work will be carried along on the trolley, and the noise level of the vacuum cleaner in operation may be reduced dramatically, such as from 75 to 40 dB, with respect to having the vacuum cleaner contained in the housing 1 outside the housing and working as a conventional mobile vacuum cleaner. Thanks to the filter 22 the result of the vacuum cleaning will also be considerably improved by having the vacuum cleaner inside the housing 1.

The invention is of course not in any way restricted to the embodiments thereof described above, but many possibilities to modifications thereof would be apparent to a person with ordinary skill in the art without departing from the scope of the invention as defined in the appended claims.

The vacuum cleaner inside the housing may be of another type than shown, such as a non-mobile vacuum cleaner. The vacuum cleaner may also be battery operated and one or more batteries may then be arranged in the housing or outside the housing.

That said portion of the housing is separable from the rest of the housing in order to uncover an opening as stated in claim 1 is to be interpreted to also cover a lid connected by a hinge to the rest of the housing and then not removable from the housing.

A cyclone separator may be arranged inside or outside the housing for prefiltering the intake air before arriving to the intake air inlet of the vacuum cleaner. Such a cyclone separator would then also function as a particle separator catching a majority of the particles in said intake air.

The trolley may be motorized, e.g. by having a battery thereon.

The invention claimed is:

1. A mobile vacuum cleaning device comprising a vacuum cleaner (2) having an intake air inlet (3), an exhaust air outlet (4) and a particle separator, wherein the device further comprises
    a housing (1) containing said vacuum cleaner (2) and having an aperture (5) to allow either a suction hose (6) or a connection therefor to be led therethrough and coupled to said intake air inlet (3) of the vacuum cleaner (2) and at least one opening (7) to direct air exhausted by the exhaust air outlet (4) of the vacuum cleaner out of the housing, at least one portion (8) of the housing being separable from the rest of the housing in order to uncover an opening for providing access to the interior of the housing,
    a suction hose (6) connected to either the intake air inlet (3) of the vacuum cleaner or said connection, said housing having members (11) making it movable, and
    a trolley (10) carrying said housing (1) and provided with said members, such as wheels (11), for moving said housing (1).

2. A device according to claim 1, wherein said trolley has means (13-16) configured to receive and contain equipment and utensils useful for cleaning work and expendable supplies associated with such work, such as soap, toilet paper.

3. A device according to claim 2, wherein said means comprises one or a plurality of shelves (13-16) connected to a frame (12) of the trolley (10).

4. A device according to claim 3, wherein said shelves (13-16) are baskets.

5. A device according to claim 3, wherein at least one of said shelves (13-16) is removably connected to said frame (12) of the trolley (10).

6. A device according to claim 2, wherein said means (13-16) is configured to contain towels and/or bedding for a plurality of beds.

7. A device according to claim 1, wherein said suction hose (6) is extraordinary long and has a length of at least 3 meters or at least 5 meters or at least 7 meters or at least 10 meters counted from said aperture (5) of the housing (1).

8. A mobile vacuum cleaning device, wherein the device further comprises
    a housing (1) containing said vacuum cleaner (2) and having an aperture (5) to allow either a suction hose (6) or a connection therefor to be led therethrough and coupled to said intake air inlet (3) of the vacuum cleaner (2) and at least one opening (7) to direct air exhausted by the exhaust air outlet (4) of the vacuum cleaner out of the housing, at least one portion (8) of the housing being separable from the rest of the housing in order to uncover an opening for providing access to the interior of the housing, and
    a suction hose (6) connected to either the intake air inlet (3) of the vacuum cleaner or said connection, said housing having members (11) making it movable,
    said suction hose (6) is extraordinary long and has a length of at least 3 meters or at least 5 meters or at least 7 meters or at least 10 meters counted from said aperture (5) of the housing (1), and
    a trolley (10) comprises a hose holder (19) to hold portions of said suction hose (6) not used and a holder (20) configured to hold a holder pipe (25) to be connected to said hose (6) and having a suction nozzle (25), when not used for vacuum cleaning.

9. A device according to claim 1, wherein it comprises at least one filter (22) arranged upon said exhaust air opening (7) of the housing (1) to additionally filter the air exhausted through the exhaust air outlet (4) of the vacuum cleaner (2) and which has been filtered in the particle separator of the vacuum cleaner.

10. A device according to claim 1, wherein said vacuum cleaner is a mobile vacuum cleaner (2), and said portion of the housing (1) being separable from the rest of the housing is configured to uncover an opening through which the vacuum cleaner may be placed into and removed from the interior of the housing.

11. A device according to claim 1, wherein at least parts of inner walls of said housing (1) are provided with a lining (27) of a sound-insulating material, such as mats of rubber or fibre material or material with open cells.

12. A method comprising using the vacuum cleaning device according to claim 1 for cleaning rooms in buildings having a plurality of bedrooms, such as hotel rooms, or buildings containing places of work, such as offices and shops.

* * * * *